(12) United States Patent
Fahl et al.

(10) Patent No.: US 8,364,303 B2
(45) Date of Patent: Jan. 29, 2013

(54) METHOD AND SYSTEM FOR CORRECTIVE PLANNING AND OPTIMIZATION OF PROCESSING PROCESSES

(75) Inventors: Marco Fahl, Walluf (DE); Iiro Harjunkoski, Schriesheim (DE); Simo Saynevirta, Espoo (FI)

(73) Assignee: ABB Technology AG, Zurich (CH)

( * ) Notice: Subject to any disclaimer, the term of this patent is extended or adjusted under 35 U.S.C. 154(b) by 380 days.

(21) Appl. No.: 11/918,632

(22) PCT Filed: Apr. 27, 2006

(86) PCT No.: PCT/EP2006/003906
§ 371 (c)(1),
(2), (4) Date: Jul. 8, 2009

(87) PCT Pub. No.: WO2006/117124
PCT Pub. Date: Nov. 9, 2006

(65) Prior Publication Data
US 2010/0004771 A1 Jan. 7, 2010

(30) Foreign Application Priority Data
May 4, 2005 (DE) .......................... 10 2005 021 337

(51) Int. Cl.
*G06F 19/00* (2011.01)
(52) U.S. Cl. ....................................... 700/122; 700/128

(58) Field of Classification Search ................... 700/28, 700/33, 97, 122–129
See application file for complete search history.

(56) References Cited

U.S. PATENT DOCUMENTS

| | | | |
|---|---|---|---|
| 2002/0083401 A1* | 6/2002 | Breiner et al. | 716/4 |
| 2004/0260421 A1* | 12/2004 | Persson et al. | 700/128 |
| 2004/0261965 A1* | 12/2004 | Burma | 162/198 |
| 2007/0029060 A1* | 2/2007 | Murray et al. | 162/134 |

FOREIGN PATENT DOCUMENTS

DE 102 19 322 A1 11/2003

OTHER PUBLICATIONS

German Search Reportp.

* cited by examiner

*Primary Examiner* — Mohammad Ali
*Assistant Examiner* — Nathan Laughlin
(74) *Attorney, Agent, or Firm* — Buchanan Ingersoll & Rooney, P.C.

(57) ABSTRACT

A method and system are provided for correcting programming and optimizing treatment and/or subsequent treatment processes in technical installations, such as in the paper industry. The method and system carry an optimization suitable for treatment processes and for corresponding subsequent treatment processes according to a production plan defined by processing qualitative data and/or information related to the quality of at least one starting product of an advanced production stage.

22 Claims, 5 Drawing Sheets

METHOD AND SYSTEM FOR CORRECTIVE PLANNING AND OPTIMIZATION OF PROCESSING PROCESSES

FIELD

The invention relates to a method and a system for corrective planning and optimization of processing processes in an engineering plant, in particular in a production plant in the paper industry. Needs-based optimization of the respective processing process is performed and achieved using condition-related information and/or qualitative data of at least one intermediate product, or an output product of an upstream production stage, where the processing process is preferably a sectioning or segmentation process, in particular also the cutting to size of the respective intermediate product.

BACKGROUND INFORMATION

In a large number of plants in the processing industry, in particular in the paper industry, metal-working industry, textile industry but also the chemicals processing industry, for example in the manufacture of polymers, the manufacturing process passes through a plurality of production stages, each having associated intermediate products or output products. At least one of these intermediate products or output products often exists as rolled goods, i.e. in the form of strips or webs wound onto reels, coils or spools, which are also called "jumbo reels", or is manufactured as flat goods in the form of sheets having a relatively large surface area, that is to say large-format sheets, for example in steel-working and/or metal-working.

A fundamental aspect of the processing and/or finishing of such reels or sheets is their sectioning according to need and their cutting to size according to need. To do this, the webs rolled onto coils or reels are usually unwound, are sectioned or segmented into smaller units according to a predefined production plan, and wound back onto suitable reels which are normally smaller to suit their sectioning.

The predefined production plan or production schedule is essentially based here on the given requirement, i.e. on the existing orders and their attendant customer-specific requirements, in particular with regard to size, volume and/or quantity and quality of the respective product. The same also applies, of course, to cutting sheets to size.

In general, this means that larger units are sectioned into smaller units, where after the sectioning or segmentation into smaller units, further processing of the respective product may then take place within the plant and/or at the customer's premises.

In practice, for cutting to size, cutting systems are used that are specially configured for the task and, for example, have suitable cutter arrangements, laser systems or waterjet cutting elements, and also reel systems or coil systems set up for this purpose.

The disadvantage with known systems and methods is that the predefined production plan, once it has been created, cannot be modified and/or adapted automatically whilst production is in progress. Sectioning of the strip, or the respective intermediate product, is planned at a time at which the intermediate product has not yet been manufactured at all, and at which there is still no information whatsoever on its quality and condition. Although manual input can be used to include some of the condition-related information and/or qualitative data in an amendment to the initial product plan, there is generally no automation of this decision process.

For example, if, as a result of the process or faults, the required quality and/or condition cannot be achieved or maintained in a strip subsection earmarked for delivery to a customer, then this strip subsection must be rejected as imperfect, i.e. it is of poorer quality or a reject.

Automated regrouping or re-sectioning of the manufactured strip, and hence automated correction of the production plan, is not possible prior to the actual cutting process.

SUMMARY

The object of the invention is to provide a facility to improve the efficiency of a plant in the processing of rolled goods or flat goods, to optimize the processing process and hence to reduce the number of rejects and/or the number of manufactured goods of poorer quality.

This object is achieved by a method having the features of claim 1 and by a system having the features of claim 15. Advantageous embodiments of the invention are given in further claims and in the description of the figures.

The invention relates to a method for corrective planning and optimization of processing processes in an engineering plant, in particular in the paper industry, pulp industry, metal-working industry, steel industry or chemicals industry. Working from a predefined production plan, needs-based optimization of the respective processing and/or finishing process is performed automatically by processing condition-related information and/or qualitative data of at least one output product of an upstream production stage and from existing product requirements, where the respective processing process is preferably the cutting to size or the segmentation or sectioning of rolled goods or flat goods.

Since the respective processing process is optimized using condition-related information and/or qualitative data of the output product of an upstream production stage, i.e. using an intermediate product that has already been manufactured and is available for finishing, it is possible to react to any faults and/or anomalies occurring during the respective production process even prior to the cutting to size or segmentation, and to correct the production plan automatically by re-sectioning the strip goods or flat goods in a manner optimized according to need. The quality of the finishing process can thereby be improved and the number of rejects reduced, which ultimately results in an increase in efficiency even of the entire plant.

The method according to the invention can then be used advantageously, in particular, when the at least one output product of the upstream production stage or the at least one intermediate product is sectioned and/or segmented during the processing and/or finishing process. The output product of the upstream production stage may be, for instance, rolled goods wound onto a reel or a coil, in particular paper, board, pulp, fabric, carpeting, steel, sheet steel, plastic film or polymer film. The aforementioned method, however, can also be used advantageously for suitable flat goods, for instance iron and/or steel sheets, but also wood, plastic or sheets of glass, to optimize the respective finishing process, in particular the cutting process and the definition of the cutting patterns required.

The condition-related information and/or qualitative data of the at least one output product of the upstream production stage is preferably determined with spatial resolution and positional accuracy in interaction with at least one data source, in particular with a quality assurance system and/or a sensor-based monitoring system. In this case, values for the length and width of the respective unwound strip are used in particular as the reference parameters. The respective length value can be found here, for example, from the time and the winding speed of the reel or the running speed of the strip. The values and data found are collected and stored on a data storage medium and/or in a database configured for the purpose.

The quality assurance system and/or the sensor-based monitoring system may here advantageously include optical sensors, electro-optic sensors, capacitive and/or inductive sensors and/or tactile sensors, chemical sensors, sensors for measuring thickness, length and width, i.e. for measuring dimensions, and sensors for measuring the roughness and/or surface finish.

The aforementioned sensors can be combined with each other to suit and consequently can also be used and/or read in combination.

The sensor data relating to the unwound strip is preferably measured with spatial resolution and positional accuracy, and saved so that it can be retrieved in the same manner, for example in a database configured for the purpose and/or on a data storage medium configured for the purpose.

The quantity, density and arrangement of respective identical sensors, and their sampling rate, essentially determine the spatial resolution in this case. The resolving power and the precision of the individual sensor essentially determine the positional accuracy.

Laboratory analyses can advantageously also be used as an additional data source, with spatially resolved qualitative data and/or condition-related information being obtained by analyses of random samples, in particular also chemical analyses, in a laboratory set up for the purpose and/or in an analysis facility set up for the purpose, and/or being stored in retrievable form in a suitably configured database.

In an advantageous embodiment of the invention, it can be provided that the needs-based optimization of the respective finishing process is performed in at least two dimensions, i.e. at least two items of dimensional data is included in the optimization in each case, for example specifically the values for length and width of the output product. This means that an optimization of the finishing process of the manufactured strip goods or flat goods, to be performed according to the method, is performed both in the longitudinal direction, i.e. lengthwise, and in the transverse direction, i.e. widthwise.

As a basic principle, optimization in three dimensions can also be conceived, for example when a plurality of layers or coatings of an item of strip goods are manufactured and wound on simultaneously, so that relevant values for thickness or depth or coating data can also be included in the needs-based optimization.

In a further embodiment of the method, it can advantageously be provided that the predefined production plan is adapted automatically to the processing or finishing process optimized according to need, and/or that the finishing process optimized according to need is automatically transferred to the control system or process system of the respective plant and/or applied to this system for implementation and finishing of the respective output product or intermediate product.

A computer program for implementing on a suitably configured data-processing unit and having the features of the method according to the invention, produces a preferred embodiment of the system according to the invention. A computer program, in particular a computer program stored on a data storage medium and having the features of the method according to the invention, is thus included explicitly in the disclosure made in the present application.

The invention is presented further below with reference to a number of drawings and exemplary embodiments.

BRIEF DESCRIPTION OF THE DRAWINGS

The invention, advantageous embodiments and improvements of the invention and particular advantages of the invention shall be explained and described in more detail with reference to the exemplary embodiments of the invention shown in the enclosed drawings, in which.

DETAILED DESCRIPTION

Figure 1:
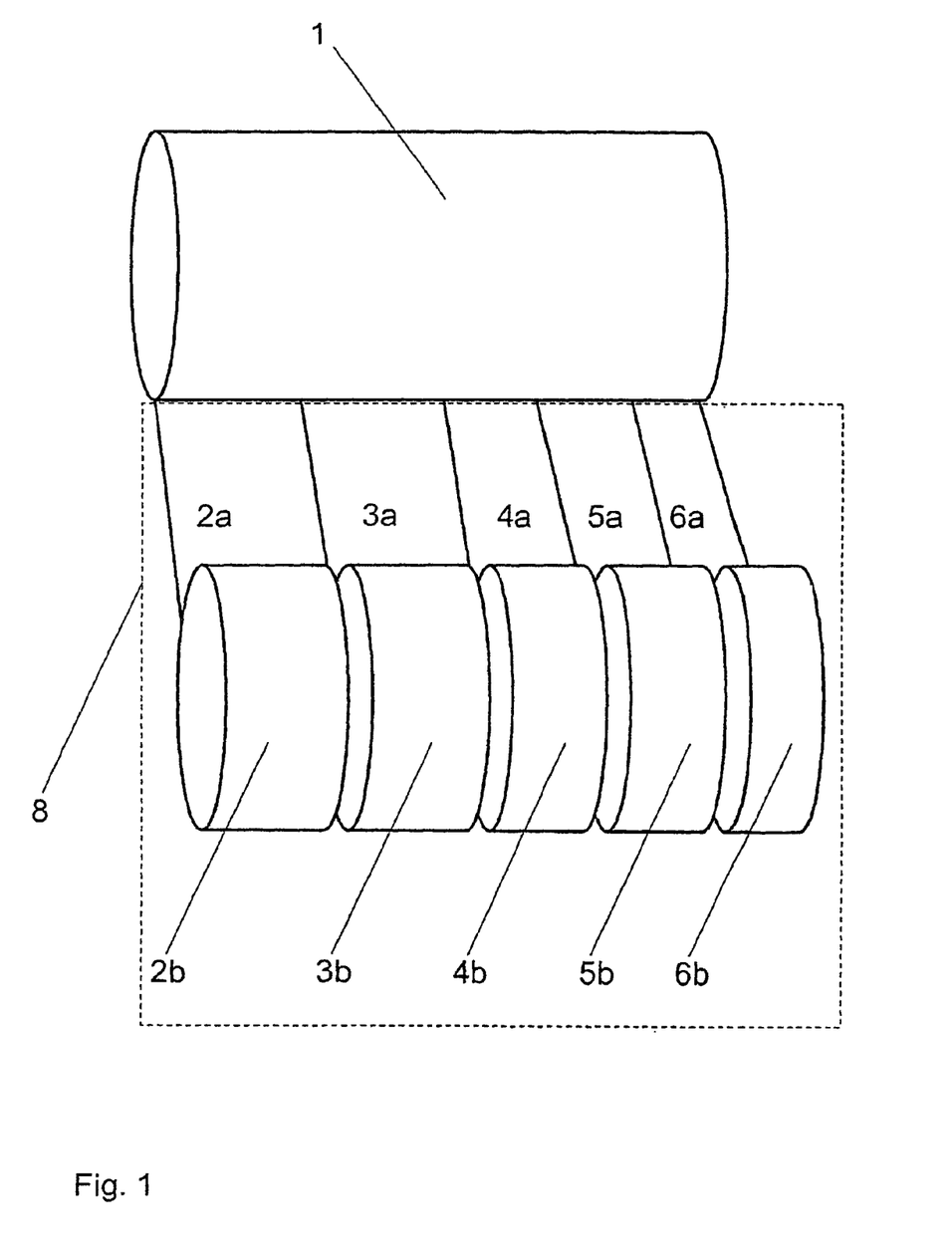
FIG. 1 shows an example of cutting a large-format reel to size

FIG. 1 shows the segmentation or cutting to size 8 of a strip wound onto a large-format reel 1 into a plurality of narrower strips 2a, 3a, 4a, 5a, 6a, in this case totaling five, which in turn are wound back onto reels 2b, 3b, 4b, 5b, 6b of smaller formats. The originally large-format reel is sectioned in this case in one dimension, i.e. only in one direction. The cut edges run parallel to the running direction of the strip in this case, and hence perpendicular to the reel axis. The result of the cutting to size 8 gives the impression that one has sectioned the large-format reel 1 into individual slices 2b, 3b, 4b, 5b, 6b of different thickness.

Figure 2:
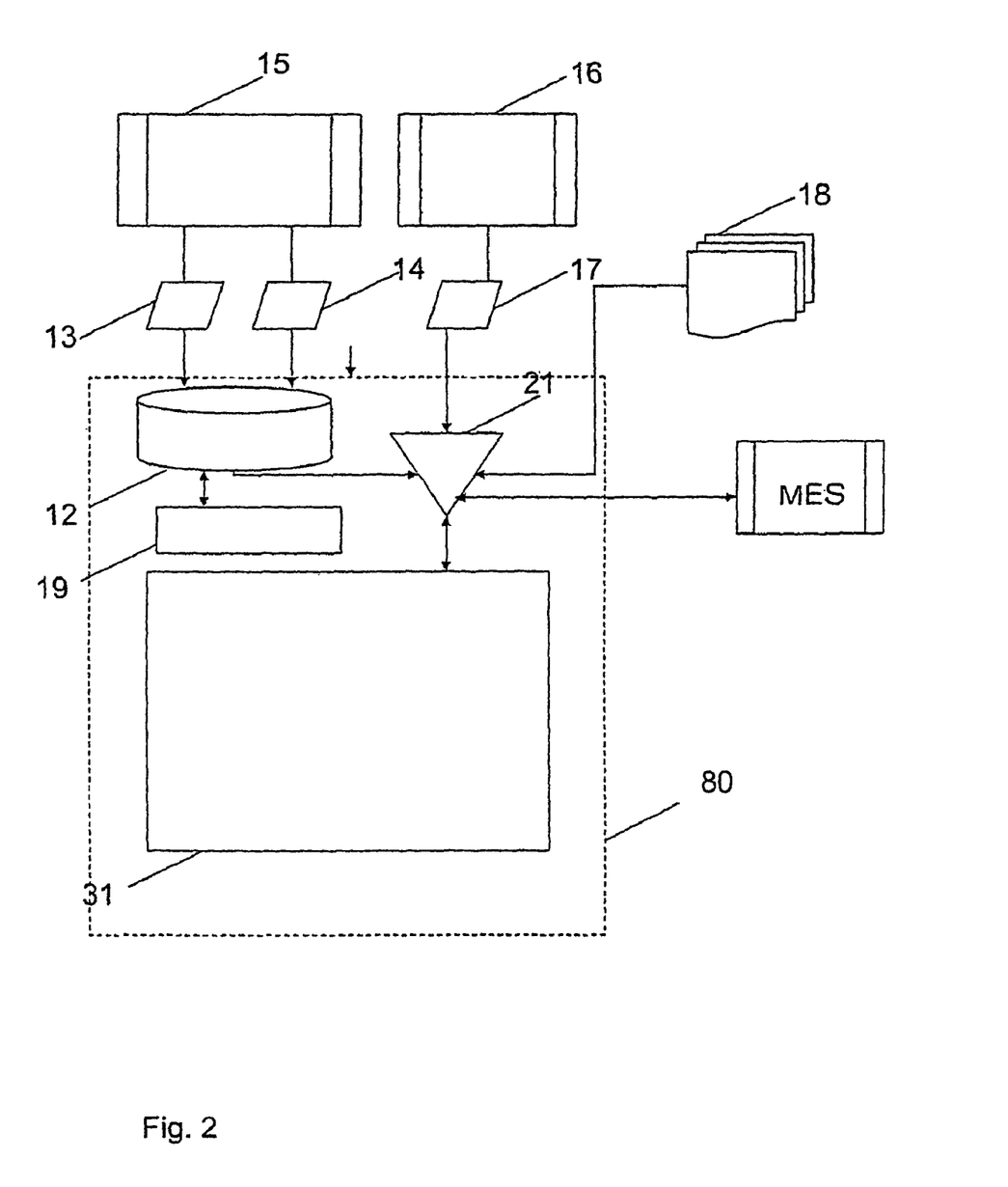
FIG. 2 shows an exemplary embodiment of a system according to the invention

FIG. 2 shows an exemplary embodiment of the system according to the invention. The system shown here for needs-based optimization of the respective processing and/or finishing process, in this case the cutting to size of a large-format paper reel, also known as a "jumbo reel", comprises a suitably configured data processing unit 80, in order to process automatically, working from a predefined production plan 18, condition-related information 13 and/or qualitative data 14 of at least one output product of an upstream production stage, for example of a large-format paper reel or jumbo reel 1, and to perform needs-based optimization of the respective finishing process, namely the cutting to size 8, automatically from existing product requirements by re-sectioning of the reel in a manner optimized according to need and/or re-definition of the cutting pattern of the large-format paper reel 1 in a manner optimized according to need.

In the example shown here, large format means a reel width of several meters and a strip length of several tens of kilometers. According to the system and method, however, there are theoretically no limits whatsoever on the size of the rolls or sheets.

For needs-based optimization of the respective finishing process, the data processing unit 80 configured for the purpose interacts with a first data source 15, in this case a combined quality assurance and monitoring system, in order to determine with spatial resolution and positional accuracy condition-related information 13 and qualitative data 14 of the large-format paper reel 1. In addition, at least one data storage device 12 is provided according to the system, on which the determined condition-related information 13 and qualitative data 14 of the large-format paper reel 1 are stored temporarily.

The combined quality assurance and monitoring system of the first data source 15 here comprises advantageously optical sensors, electro-optic sensors, capacitive and/or inductive and/or tactile sensors, chemical sensors, sensors for measuring thickness, length and width and sensors for measuring position, and sensors for measuring the roughness and/or surface finish of the wound-on paper strip or paper web.

The aforementioned sensors can be combined with each other to suit and consequently can also be used and/or read in combination.

The measured sensor data relating to the unwound paper strip or unwound paper web can advantageously be stored and retrieved with spatial resolution and positional accuracy.

The data storage device 12 and the temporary storage of condition-related information 13 and qualitative data 14 is optional here, and, for example, allows post-processing of the respective data records, for example by means of suitable filter and/or selection functions and/or processing functions, in order to reduce or limit, for example, the range of data or quantity of data.

A post-processing unit 19 can advantageously be provided here for post-processing the stored information and data.

According to the system, at least one interface 21 is also provided, which acquires and collects, with access to the data storage device 12, the temporarily stored condition-related information 13 and qualitative data 14, and, if applicable in interaction with a second data source 16, additional information, in this case analysis data 17 from an analysis unit, and, with access to the predefined production plan, customer-specific product requirements 18, and forwards all this information to a processing unit 31.

The aforementioned data sources 15, 16 may be quality assurance systems and/or a sensor-based monitoring system, but also measuring equipment and/or analysis facilities. In addition, a data storage device 12 and/or a database, in, or on, which the relevant information has been stored in retrievable form, can serve as the data source.

The processing unit 31 effects the spatially resolved comparison and evaluation of condition-related information 13, qualitative data 14 and analysis data 17 with respect to the respective customer-specific product requirements or the customer-specific product demand.

The comparison data found is evaluated here with regard to the respective product value, so that the quality rating of each product can be defined and/or represented as a function of its respective position or arrangement within the paper strip of the large-format paper reel. It is hence possible to define for each possible cutting pattern the respective yield and/or the respective output with respect to the required quality, and to make a comparison on this basis between the various cutting patterns or sectionings.

In this case, each product having customer-specific requirements is simulated with regard to the quality and/or condition required of it in each case, and defined by quality grades, for example quality A, quality B and reject, accordingly. The processing unit 31 here effects a simulated sampling of the large-format reel 1 and of the wound-on paper strip with regard to aforementioned quality grades, i.e. a spatially resolved comparison is made of the recorded condition-related information 13 and qualitative data 14 of the large-format reel 1, also known as a reel or "jumbo reel", with the quality grades created, so that as a result, the paper strip wound onto the large-format reel 1 is divided into individual quality zones, for instance specifically quality zones of quality A, quality B or reject. It can be provided advantageously here, that the aforementioned procedure is implemented on a plurality or all of the finished output products of the upstream production stage, in this case large-format reels.

The processing unit 31 then generates from the available comparison data and available analysis results, according to requirements, an optimization model, and automatically develops a proposed solution corresponding to the respective optimization model, which is used for needs-based optimization of the respective finishing process.

The processing unit 31 advantageously effects here an optimization of the finishing process, in this case the cutting to size of the paper strip of the large-format reel 1 in at least two dimensions, i.e. the finishing process is performed by the processing unit 31 both in the axial direction of the reel and in the running direction or longitudinal direction of the strip.

For intermediate products having a plurality of coating options that can be used, advantageously a processing unit can also be used that performs an optimization in a further, third dimension, namely through the depth or according to the respective coating.

Furthermore, according to the system, at least one interface is provided that transfers the optimized finishing process to, for example, the MES (Manufacturing Execution System) and/or the master system or control system of the respective plant, for implementation. Advantageously, that interface 21 also used for acquiring the input data, in particular condition-related information and/or qualitative data, can also be used. Thus according to the system, a plurality of separate interfaces or at least one multifunctional interface 21 can be provided for communicating with data sources 15, 16 and/or with master systems and/or control systems and/or with data storage device 12 and/or for access to the predefined production plan 18.

Figure 3:
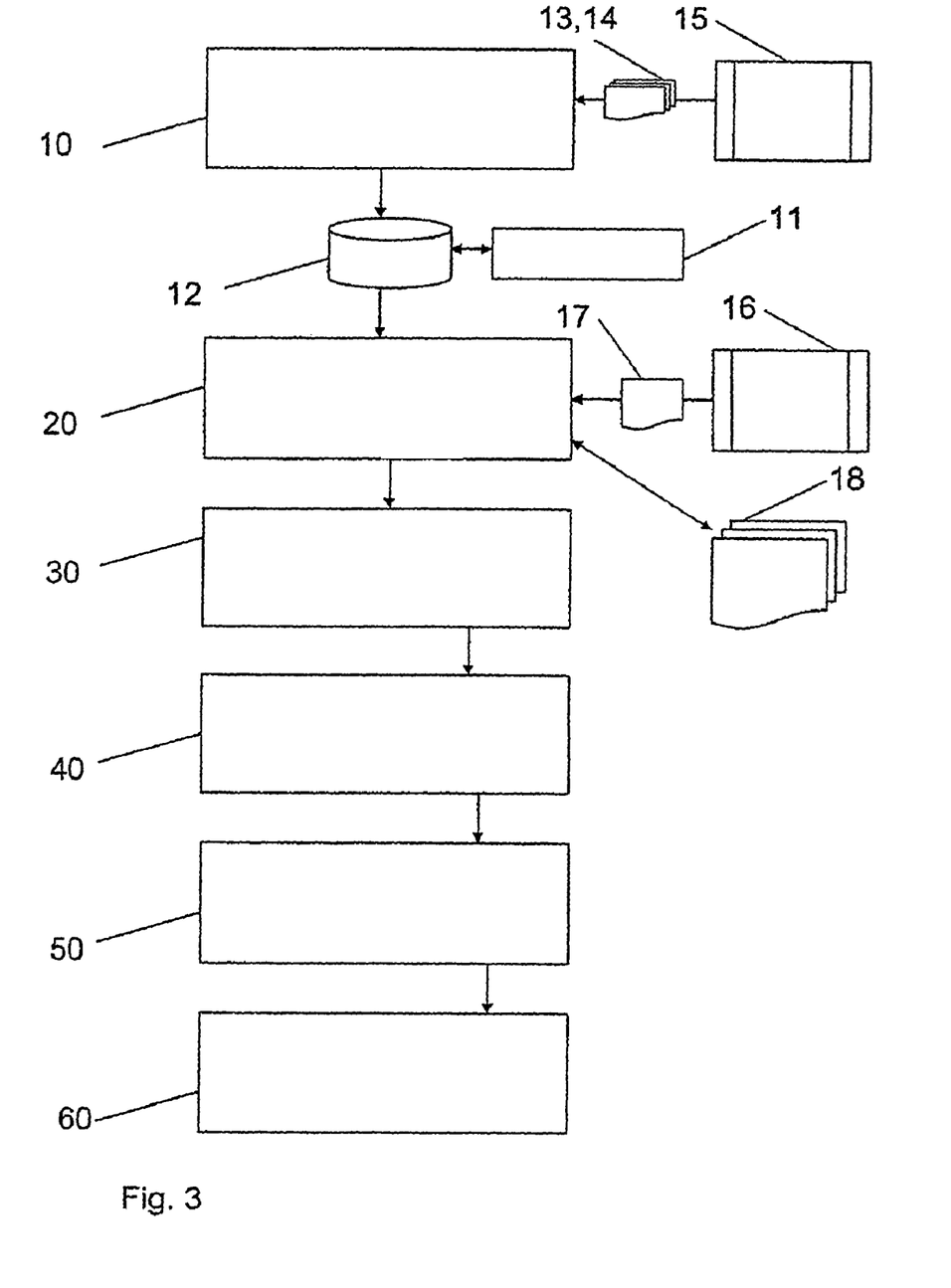
FIG. 3 shows an exemplary embodiment of a method according to the invention

FIG. 3 shows an exemplary embodiment of the method according to the invention, where for needs-based optimization of the finishing process, in this case the cutting to size of a large-format paper reel or pulp reel, working from a predefined production plan 18, automatic processing of condition-related information 13 and/or qualitative data 14 of at least one output product of an upstream production stage, in this case of at least one large-format paper reel or jumbo reel 1, is performed, and using available product requirements 18, automatic needs-based optimization of the respective finishing process is performed, namely the cutting to size, by re-sectioning the reel in a manner optimized according to need and/or re-definition of the cutting pattern of the large-format paper reel in a manner optimized according to need.

In the example shown here, large format means a reel width of several meters and a strip length of several tens of kilometers. According to the method, however, there are theoretically no limits whatsoever on the size of the rolls or sheets.

By means of a system configured for the purpose, which advantageously can also be implemented as a data processing unit 80 (see FIG. 1) having suitable program components and interfaces, the needs-based optimization is implemented according to the method in a plurality of steps, where in a first step 10, in interaction with a first data source 15, in this case a combined quality assurance and monitoring system, condition-related information 13 and qualitative data 14 of the at least one large-format paper reel 1 is determined with spatial resolution and positional accuracy, and temporarily stored on a data storage device 12. In this case, values for the length and width of the respective strip are used as the reference parameters. The respective length value can be found here from the time and winding speed or running speed.

The combined quality assurance and monitoring system 15 here advantageously comprises optical sensors, electro-optic sensors, capacitive and/or inductive and/or tactile sensors, chemical sensors, sensors for measuring thickness, length and width, and sensors for measuring position, and sensors for measuring the roughness and/or surface finish of the wound-on paper strip or paper web.

The aforementioned sensors can be combined with each other to suit and consequently can also be used and/or read in combination.

The measured sensor data relating to the unwound paper strip or unwound paper web can advantageously be stored and retrieved with spatial resolution and positional accuracy.

The temporary storage of condition-related information 13 and qualitative data 14 on a data storage device 12 performed in the first step 10 is optional here, and provides the opportunity of post-processing the respective data records, for example by means of suitable filter and/or selection functions and/or processing functions, in order to reduce or limit, for example, the range of data or quantity of data.

Suitable post-processing of the stored information and data can be performed advantageously here in an intermediate step 11 by means of a post-processing unit 19.

In an alternative embodiment, it is also possible to acquire the condition-related information 13 and/or qualitative data 14 of the large-format paper reel 1 directly without temporary storage on the data storage device 12.

In a second step 20, with access to the data storage device 12, the temporarily stored condition-related information 13 and qualitative data 14, and, if applicable, in interaction with a second data source, additional information, in this case analysis data 17 from an analysis unit 16, and, with access to the predefined production plan, customer-specific product requirements 18 are acquired and collected.

The aforementioned data sources 15, 16 may be quality assurance systems and/or a sensor-based monitoring system, but also measuring equipment and/or analysis facilities. In addition, a data storage device 12 and/or a database, in, or on, which the relevant information has been stored in retrievable form, can serve as the data source here.

In a third step 30, the acquired data is then processed in such a way that a spatially resolved comparison of the condition-related information 13, qualitative data 14 and analysis data 17 is performed with respect to the respective customer-specific product requirements or the customer-specific product demand, and an evaluation carried out.

The comparison data found is evaluated here with regard to the respective product value, so that the quality rating of each product can be defined and/or represented as a function of its respective position or arrangement within the paper strip of the large-format paper reel. It is hence possible to define for each possible cutting pattern the respective yield and/or the output with respect to the required quality, and to make a comparison between the various cutting patterns or sectionings.

In practice, the comparison and the evaluation can be performed here in such a way, for example, that each product having customer-specific requirements is simulated with regard to the quality and/or condition required of it in each case, and quality grades, for example quality A, quality B and reject, are defined accordingly. Simulated sampling of the large-format reel 1 and of the wound-on paper strip is performed with regard to aforementioned quality grades, i.e. a spatially resolved comparison is made of the recorded condition-related information 13 and qualitative data 14 of the large-format reel (jumbo reel) 1 with the quality grades created, so that as a result, the paper strip wound onto the large-format reel 1 can be divided into individual quality zones (quality A, quality B, reject). It can be provided advantageously here, that aforementioned steps 10, 20, 30 are also performed so that they include a plurality or all of the finished output products of the upstream production stage, in this case large-format reels.

A product is generally understood to mean here both the respective strip that has been cut to size according to need and wound onto a reel, and the strip that has not been wound on.

Then in a fourth step 40, an optimization model is generated according to requirements from the available comparison data and available analysis results, and in a fifth step 50 a proposed solution is automatically developed for the respective optimization task, and the respective finishing process is optimized according to need.

The optimization task or an optimization model corresponding to this task can be realized or implemented here, for example, by a mathematical description that is based on a linear model and has a suitable target function, where the linear model has variables, in particular binary variables, that define the arrangement of each product within the respective large-format reel or within the unwound strip of the large-format reel, and hence specify the cutting pattern defining the finishing process.

The linear model can optionally follow a discrete or continuous approach to its formulation.

If the linear model follows a discrete approach to its formulation, the large-format reel or the unwound strip of the reel is sectioned or divided into discrete sections geometrically by means of a net of equidistant discretization points. A logical variable is given the value "true" if, according to the cutting pattern, it corresponds to the left-hand corner of one of the reels to be manufactured; otherwise it is given the value "false". The rules that apply to the discrete formulation approach are:

Each reel to be manufactured shall start at just one position, and

The reels shall not overlap each other.

If, on the other hand, the linear model follows a continuous approach, as shown in FIG. 6, then the internal arrangement of the reels to be produced are expressed by logical variables having the values "false" or "true", and the respective position is found with the reel width being considered as a continuous variable.

The rules that apply to the continuous formulation approach are:

Each reel to be produced shall correspond to a reserved sector of the large-format reel, The width of the respective sector is determined by the dimension of the reel to be produced at the time, The different reserved sectors must not overlap or must not intersect each other, and Each sector should be assigned to a quality zone, where the center of the sector is used for determining the assignment.

One of the major advantages of the method of the type in question is based on the fact that it is possible to assign the position of each strip to be manufactured on a reel to a quality zone of the respective large-format reel, and the resultant yield and/or output in each case can be determined.

The coefficients of the target function on which the optimization model or optimization task is based, can advantageously be determined directly for any start position of the third step 30.

The respective optimization task can be viewed here as mixed integer linear programming, MILP for short.

If a usable optimization model is found, then in the fifth step 50, automatically, for example by solving the relevant mixed integer linear programming task. Methods, and applications based on such methods, for solving mixed integer programming problems are already sufficiently known, so that there is no need to present these methods here in further detail. Such applications can be called, for example, via either a C/C++ library or special modeling interfaces.

The optimization model can advantageously be designed according to requirements to minimize the reject rate and/or to maximize the product quality and/or to maximize the achievable profit. In addition, other optimization targets can also be modeled using the target function.

The efficiency of such applications in solving mixed integer programming problems, however, is always dependent on the level of detail and/or the required accuracy and/or the complexity of the optimization task on which it is based, with a corresponding processing time and capacity being required to solve such a problem. Since the problem to be solved here or the respective optimization model is relatively complex in nature, a possible efficient approach to a solution exists by proceeding in two stages, namely solving the optimization problem initially in one dimension, namely across the width of the large-format reel, i.e. in the direction of the reel axis, by means of the discrete formulation approach and a rather coarser discretization net, then retaining the determined reels, or rather the sectioning of the large-format reel determined in this way, and determining in a second stage an exact solution of the optimization model in one dimension by means of the continuous formulation approach and the determined width sectioning in the direction of the reel axis. In a further stage, a suitable procedure is applied to solve the optimization model in the second dimension, namely in the longitudinal direction of the large-format strip, i.e. perpendicular to the reel axis. Here, the retained sectioning and/or the retained cutting patterns in the longitudinal direction of the strip of the large-format reel, i.e. perpendicular to the reel axis, are again subject to an optimization process with respect to the longitudinal coordinate of their start position. Reorganization and regrouping of the strips to be manufactured and correction of an existing cutting pattern of the large-format reel, for example in the form of an existing production plan, are thereby achieved.

Both aforementioned optimization stages can advantageously be executed either sequentially or even simultaneously, depending on the resources available at the time, the permitted processing time and the processing rules and boundary conditions to be observed. The sequence of the optimization stages is advantageously also reversible, so that alternatively, for example, an optimization can also be performed initially perpendicular to the reel axis and then parallel to the reel axis. For example, in such a way, optimization of the order of individual cutting-pattern sequences predefined by the production plan can also be achieved perpendicular to the reel axis and subsequently optimization within the respective sequence can then be achieved parallel to the reel axis.

Advantageously by means of a suitable procedure, optimization in a third dimension can also be provided, for example when a plurality of layers or coatings of an item of strip goods are manufactured and/or wound on simultaneously, so that relevant values for thickness or depth or coating data can also be included in the needs-based optimization.

The aforementioned procedure means it is possible to determine an almost exact solution to the task set or to the generated optimization model, and hence to perform needs-based optimization of the respective finishing process in just a few seconds of processing time.

In a sixth step 60, the determined optimization solution and hence the optimized finishing process are transferred to, for example, the MES (Manufacturing Execution System) and/or the master system or control system of the respective plant, for implementation.

Figure 4:
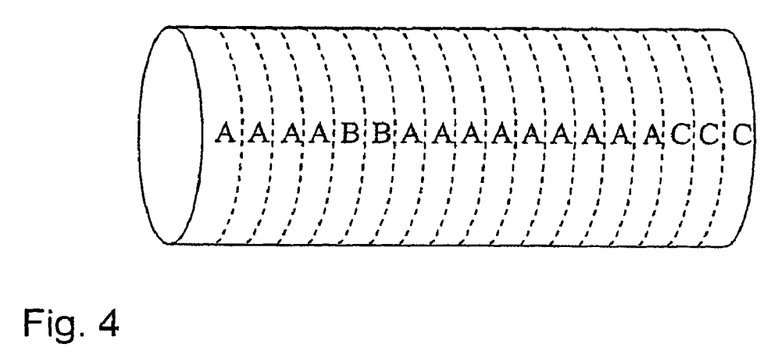
FIG. 4 shows a large-format reel sectioned into discrete quality zones

FIG. 4 shows an example of a discretization approach. According to the selected discretization level, each discretized section of the large-format reel can be assigned a quality characteristic A, B or C. Optimization by means of a discrete formulation approach is performed here initially in one dimension and merely constitutes an intermediate stage of the overall optimization process.

Figure 5:
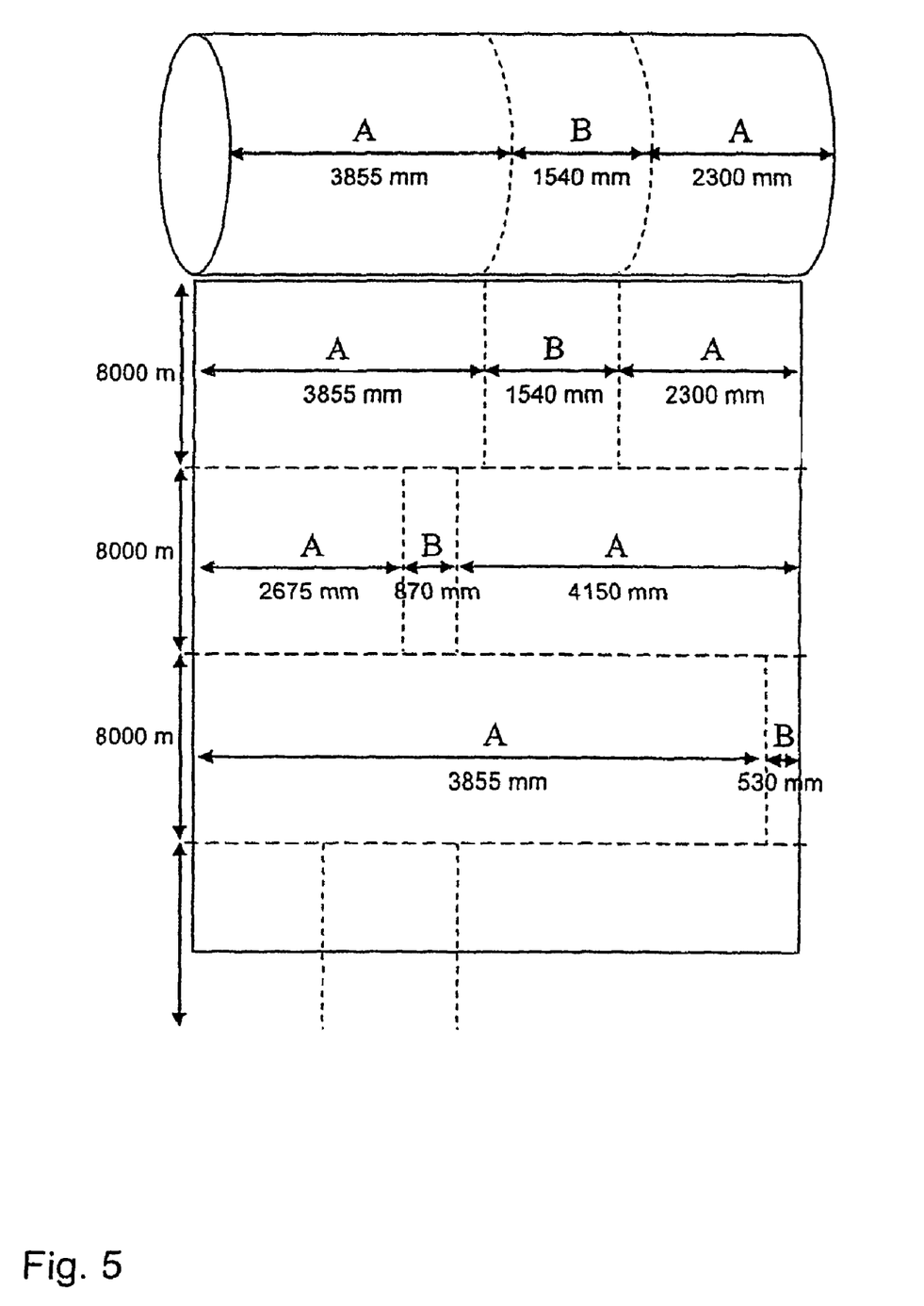
FIG. 5 shows optimized cutting patterns and quality classification of a large-format reel.

FIG. 5 shows a division according to the method or a corresponding cutting to size of a large-format reel into individual smaller units or segments of different width and length in qualities A and B. Optimization has been fully carried out in this case, and was performed both lengthwise, along the unwound strip, and also widthwise, i.e. along the reel axis.

The invention claimed is:

1. A method for corrective planning and optimization of a finishing process in the processing of at least one of rolled goods and flat goods, wherein the finishing process cuts to size an intermediate product by utilizing at least one of a plurality of cutting patterns, the method comprising:
    working from a predefined production plan, performing needs-based optimization of the finishing process in a processing unit of a computer processing device, prior to commencing the finishing process on the intermediate product, the optimization being performed in the following steps including:
    in a first step, determining with spatial resolution, with access to at least one data source, condition-related information and/or qualitative data relating to the intermediate product that has already been manufactured and is available for finishing;
    in a second step, acquiring customer-specific product requirements;
    in a third step, processing the determined condition-related information and/or qualitative data, wherein a spatially resolved comparison of the determined condition-related information and/or qualitative data is performed with respect to the acquired customer-specific product requirements, so that for each possible cutting pattern, at least one of a respective yield and a respective output with respect to a required quality is defined, and a comparison is made on this basis between various cutting patterns;
    in a fourth step, generating an optimization model according to the requirements; and
    in a fifth step, automatically determining a proposed solution for the optimization model so as to define a finishing process where the cutting pattern is re-defined in a manner optimized according to need.

2. The method as claimed in claim 1, wherein the finishing process optimized according to need is transferred to a control system or process system of a respective processing plant and/or applied to a process system for implementation and finishing of the respective intermediate product.

3. The method as claimed in claim 1, wherein:
    in the first step, with access to the at least one data source, the condition-related information and/or qualitative data relating to the intermediate product are stored temporarily with spatial resolution; and
    in the second step, the temporarily stored data, in interaction with an additional data source, additional information, and, with access to the predefined production plan, customer-specific product requirements are acquired and collected.

4. The method as claimed in claim 3, wherein the optimization model is designed according to requirements so as to achieve a predetermined optimization target, and wherein data compared in the comparison is evaluated by representing a product quality rating as a function of a position of the intermediate product in an upstream production stage.

5. The method as claimed in claim 1, wherein the needs-based optimization of the finishing process is performed in at least two dimensions.

6. The method as claimed in claim 1, wherein the intermediate product is a semi-finished product wound onto a reel, coil or spool.

7. The method as claimed in claim 1, wherein the method is used in the paper industry in paper processing for needs-based optimization of the cutting process and for defining the required cutting patterns.

8. A system for corrective planning and optimization of a finishing process in at least one of rolled goods and flat goods, wherein the finishing process cuts to size an intermediate product by utilizing at least one of a plurality of cutting patterns, the system comprising:
    means for operating with a predefined production plan; and
    means for performing, from the predefined production plan, needs-based optimization of the finishing process, prior to commencing the finishing process on the intermediate product, wherein the performing means comprises at least one processing unit and at least one interface to perform the perform the optimization,
    wherein the at least one processing unit is configured to determine with spatial resolution, with access to at least one data source, condition-related information and/or qualitative data relating to the intermediate product that has already been manufactured and is available for finishing,
    wherein the at least one interface is configured to acquire customer-specific requirements,
    wherein the at least one processing unit is configured to process the determined condition-related information and/or qualitative data, by performing a spatially resolved comparison of the determined condition-related information and/or qualitative data with respect to the acquired customer-specific product requirements, so that for each possible cutting pattern, at least one of a respective yield and a respective output with respect to a required quality is defined, and to make a comparison on this basis between various cutting patterns,
    wherein the at least one processing unit is configured to generate an optimization model according to the requirements, and
    wherein the processing unit is configured to automatically determine a proposed solution for the optimization model so as to define a finishing process where the cutting pattern is re-defined in a manner optimized according to need.

9. The system as claimed in claim 8, wherein:
    the at least one interface is configured to transfer the finishing process optimized according to need to at least one of a control system, a process system and a MES system of a finishing plant, and/or to apply the finishing process to the system for implementation and finishing of the intermediate product.

10. The system as claimed in claim 8, comprising:
    a data storage device for temporary storage of the condition-related information and/or qualitative data.

11. The system as claimed in claim 9, wherein the processing unit is configured to perform the spatially resolved processing of the condition-related information and/or qualitative data of the intermediate product.

12. The system as claimed in claim 8, wherein the optimization model is designed according to the requirements so as to achieve a predetermined optimization target, and
    wherein the processing unit represents the product quality rating as a function of a position of the intermediate product.

13. The system as claimed in claim 8, wherein the needs-based optimization of the finishing process is performed in at least two dimensions.

14. The system as claimed in claim 8, wherein the intermediate product is a semi-finished product wound onto at least one of a reel, coil or spool, pulp, board, sheet steel, plastic film and polymer film.

15. The system as claimed in claim 8, wherein the system is used in the paper industry in paper processing for needs-based optimization of the cutting process and for defining the required cutting patterns.

16. The method as claimed in claim 1, comprising providing corrective planning and optimization of the finishing process in engineering plants of the paper industry.

17. The method as claimed in claim 5, wherein the condition-related information and/or qualitative data is determined and/or stored with spatial resolution in interaction with a quality assurance system and/or a sensor-based monitoring system.

18. The method as claimed in claim 4, wherein the optimization model is designed according to requirements so as to minimize the reject rate and/or to maximize the product quality and/or to maximize the achievable profit.

19. The system as claimed in claim 8, wherein the system is configured to provide corrective planning and optimization of processing processes in engineering plants of the paper industry.

20. The system as claimed in claim 8, wherein the at least one data source comprises a quality assurance system and/or a sensor-based monitoring system.

21. The system as claimed in claim 12, wherein the optimization model is designed according to requirements so as to minimize the reject rate and/or to maximize the product quality and/or to maximize the achievable profit.

22. The method as claimed in claim 6, wherein the intermediate product is paper, pulp, board, sheet steel, plastic film or a polymer film.

* * * * *